(12) United States Patent
Taira et al.

(10) Patent No.: US 11,144,263 B2
(45) Date of Patent: Oct. 12, 2021

(54) PRINTER DRIVER

(71) Applicant: KYOCERA Document Solutions Inc., Osaka (JP)

(72) Inventors: Yoshiyuki Taira, Osaka (JP); Toshimitsu Morimoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/775,462

(22) Filed: Jan. 29, 2020

(65) Prior Publication Data

US 2020/0257482 A1     Aug. 13, 2020

(30) Foreign Application Priority Data

Feb. 7, 2019    (JP) .............................. JP2019-020368

(51) Int. Cl.
    *G06F 3/12*          (2006.01)
    *H04N 1/40*         (2006.01)

(52) U.S. Cl.
    CPC ....... *G06F 3/1254* (2013.01); *H04N 1/40012* (2013.01)

(58) Field of Classification Search
None
See application file for complete search history.

(56) References Cited

U.S. PATENT DOCUMENTS

| | | | | |
|---|---|---|---|---|
| 6,049,394 A * | 4/2000 | Fukushima | ............ | G06K 15/02 358/1.15 |
| 6,344,908 B1 * | 2/2002 | Aritomi | .................. | H04N 1/56 358/529 |
| 6,356,363 B1 * | 3/2002 | Cooper | .................. | G06K 15/00 358/1.8 |
| 6,384,930 B1 * | 5/2002 | Ando | .................... | G06F 3/1297 358/1.17 |
| 6,529,289 B1 * | 3/2003 | Konno | ..................... | H04N 1/40 358/1.17 |
| 6,781,724 B1 * | 8/2004 | Szajewski | .......... | H04N 1/00167 358/487 |
| 6,937,360 B1 * | 8/2005 | Ikeda | ................. | H04N 1/32609 347/115 |
| 9,302,878 B2 * | 4/2016 | Ono | .................... | G03G 21/1647 |

(Continued)

FOREIGN PATENT DOCUMENTS

JP        2006-134057        5/2006

*Primary Examiner* — Anh-Vinh T Nguyen
(74) *Attorney, Agent, or Firm* — Lex IP Meister, PLLC

(57) ABSTRACT

A computer, which executes a color machine driver for outputting print data generated by an application program for generating the print data to a color image forming apparatus, accepts an interlocking setting, which is a setting for whether a color setting which is a setting for causing the color image forming apparatus to execute color printing or monochrome printing is interlocked with the application program. In case that the color setting is set not to be interlocked with the application program in the interlocking setting, when the color setting in the color machine driver is a color setting that causes the color image forming apparatus to execute the monochrome printing, the computer causes the application program to generate print data for the color image, and executes a monochrome image forming process for converting the color image into a monochrome image.

3 Claims, 15 Drawing Sheets

(56) References Cited

U.S. PATENT DOCUMENTS

| | | | |
|---|---|---|---|
| 2002/0030846 A1* | 3/2002 | Moriyama | H04N 1/603 358/1.15 |
| 2004/0012816 A1* | 1/2004 | Minowa | H04N 1/465 358/2.1 |
| 2007/0059051 A1* | 3/2007 | Kaiho | G03G 15/0194 399/299 |
| 2008/0074687 A1* | 3/2008 | Upton | H04N 1/644 358/1.9 |
| 2008/0247792 A1* | 10/2008 | Kubo | G03G 15/161 399/377 |
| 2009/0009781 A1* | 1/2009 | Cho | H04N 1/62 358/1.9 |
| 2009/0231623 A1* | 9/2009 | Kuwahara | B41J 29/393 358/1.15 |
| 2010/0027040 A1* | 2/2010 | Kuroda | G03G 15/6585 358/1.9 |
| 2010/0098465 A1* | 4/2010 | Saito | G03G 15/161 399/297 |
| 2010/0253955 A1* | 10/2010 | Murata | H04N 1/6019 358/1.9 |
| 2011/0051199 A1* | 3/2011 | Kim | H04N 1/6016 358/3.24 |
| 2012/0174211 A1* | 7/2012 | Suzuki | H04L 63/0838 726/18 |
| 2014/0185047 A1* | 7/2014 | Tajima | G01J 3/46 356/402 |
| 2016/0062277 A1* | 3/2016 | Yamauchi | G03G 15/1605 399/128 |
| 2016/0219160 A1* | 7/2016 | Sugahara | G06F 3/1239 |
| 2016/0306314 A1* | 10/2016 | Suto | G03G 15/6529 |
| 2017/0068185 A1* | 3/2017 | Suenami | G03G 15/0893 |
| 2017/0277102 A1* | 9/2017 | Takai | G03G 15/6502 |
| 2018/0143576 A1* | 5/2018 | Nishioka | B65H 1/266 |
| 2019/0346798 A1* | 11/2019 | Nakamoto | G03G 15/2017 |
| 2021/0099594 A1* | 4/2021 | Ochi | H04N 1/00795 |

* cited by examiner

PRINTER DRIVER

INCORPORATION BY REFERENCE

This application is based upon, and claims the benefit of priority from, corresponding Japanese Patent Application No. 2019-020368 filed in the Japan Patent Office on Feb. 7, 2019, the entire contents of which are incorporated herein by reference.

BACKGROUND

Field of the Invention

The present disclosure relates to a printer driver for outputting print data to an image forming apparatus.

Description of Related Art

Conventionally, there has been known a computer which executes an application program for generating print data and a printer driver for outputting the print data generated by the application program to an image forming apparatus.

SUMMARY

A printer driver of the present disclosure for outputting print data generated by an application program for generating the print data to an image forming apparatus causing a computer to execute an interlocking setting accepting unit which accepts an interlocking setting which is a setting as to whether a color setting which is a setting for causing the image forming apparatus to execute color printing or monochrome printing is interlocked with the application program, and to execute a process execution unit which executes a process corresponding to the color setting in the printer driver, in case that the color setting is set not to be interlocked with the application program in the interlocking setting, when the color setting in the printer driver is the color setting for causing the image forming apparatus to execute the monochrome printing, the process execution unit causes the application program to generate the print data of a color image and executes a monochrome image forming process for converting the color image into a monochrome image.

DETAILED DESCRIPTION

Hereinafter, embodiments of the present disclosure will be described with reference to the drawings.

First, a configuration of an image forming system according to an embodiment of the present disclosure will be described.

Figure 1:
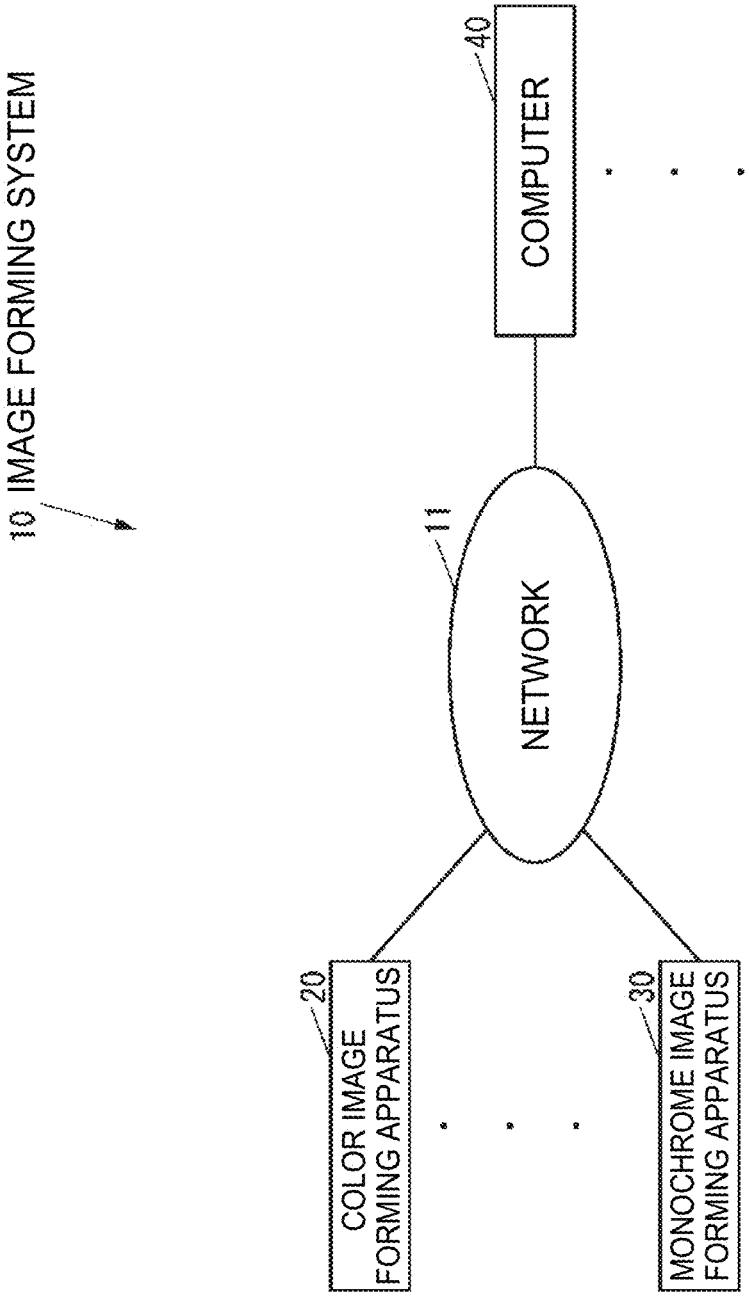
FIG. 1 is a block diagram of an image forming system according to an embodiment of the present disclosure.

FIG. 1 is a block diagram of an image forming system 10 according to the present embodiment.

As shown in FIG. 1, the image forming system 10 includes a color image forming apparatus 20 as an image forming apparatus capable of executing both monochrome printing and color printing, a monochrome image forming apparatus 30 as an image forming apparatus capable of executing only the monochrome printing in the monochrome printing and the color printing, and a computer 40 for transmitting print data to the image forming apparatus. The color image forming apparatus 20, the monochrome image forming apparatus 30 and computer 40 can communicate with one another via a network 11 such as a local area network (LAN) or the Internet.

The image forming system 10 may include at least one color image forming apparatus having a configuration similar to that of the color image forming apparatus 20 in addition to the color image forming apparatus 20. The image forming system 10 may include at least one monochrome image forming apparatus having a configuration similar to that of the monochrome image forming apparatus 30 in addition to the monochrome image forming apparatus 30. The image forming system 10 may include at least one computer having a configuration similar to that of the computer 40 in addition to the computer 40.

Figure 2:
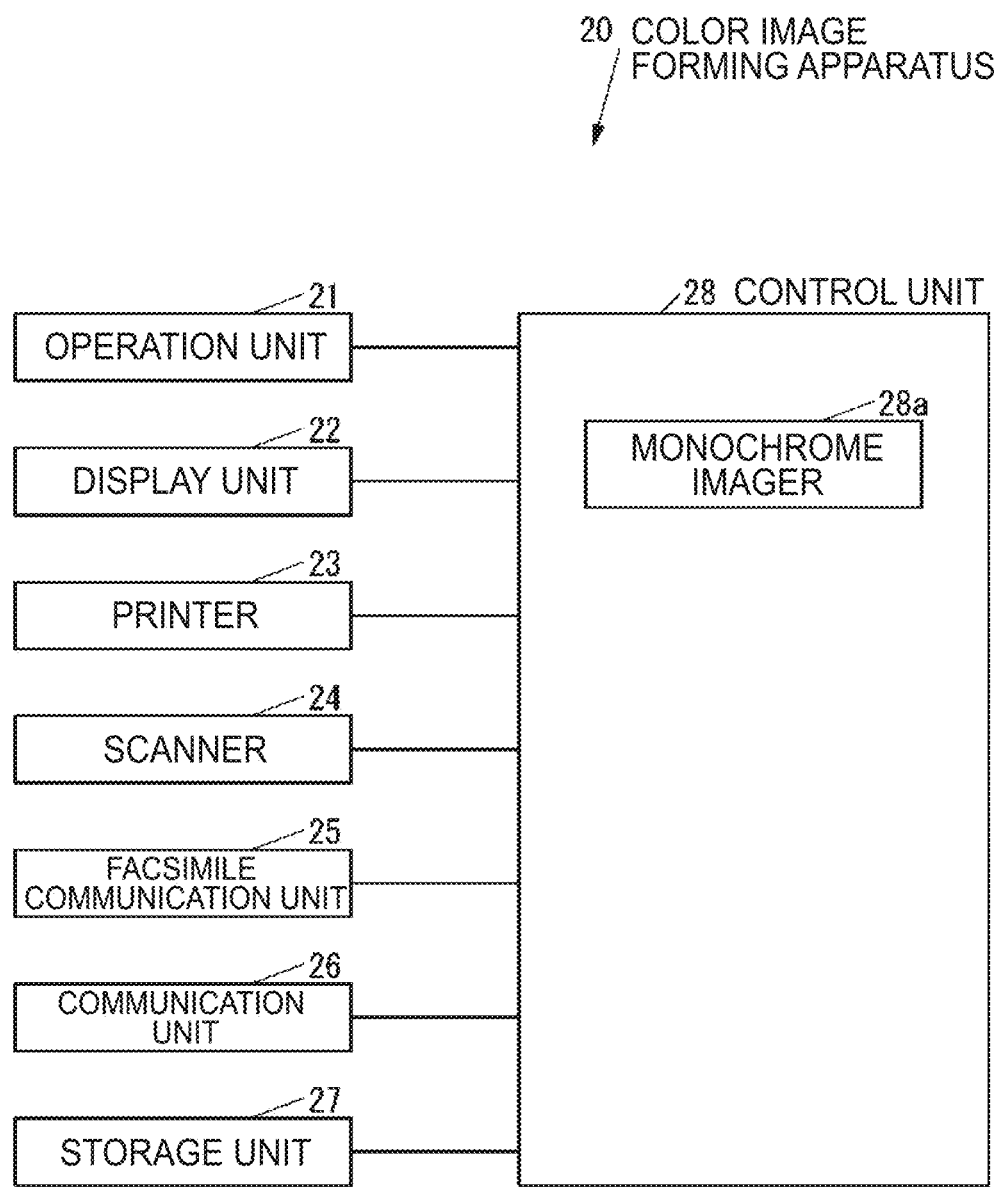
FIG. 2 is a block diagram of a color image forming apparatus shown in FIG. 1 in the case of a multifunction peripheral (MFP)

FIG. 2 is a block diagram of the color image forming apparatus 20 in the case of a multifunction peripheral (MFP).

As shown in FIG. 2, the color image forming apparatus 20 includes an operation unit 21 which is an operation device such as a button for inputting various operations, a display unit 22 which is a display device such as a liquid crystal display (LCD) for displaying various information, and a printer 23 which is a printing device for printing an image on a recording medium such as paper. The color image forming apparatus 20 further includes a scanner 24 which is a reading device for reading an image from a document, a facsimile communication unit 25 which is a facsimile device that performs facsimile communication with an external facsimile apparatus not shown via a communication line such as a public telephone line, and a communication unit 26 which is a communication device that communicates with an external device, via a network such as a LAN or the Internet, or directly by wire or wireless without intervening the network. The color image forming apparatus 20 further includes a storage unit 27 which is a non-volatile storage device such as a semiconductor memory or a hard disk drive (HDD) that stores various types of information, and a control unit 28 which controls the entire color image forming apparatus 20.

The control unit 28 includes, for example, a central processing unit (CPU), a read only memory (ROM) storing a program and various data, and a random access memory (RAM) as a memory used as a working area of the CPU in the control unit 28. The CPU in the control unit 28 executes a program stored in the storage unit 27 or the ROM in the control unit 28.

The control unit 28 executes the program stored in the storage unit 27 or the ROM in the control unit 28, to realize a monochrome imager 28a which converts a color image into a monochrome image.

Figure 3:
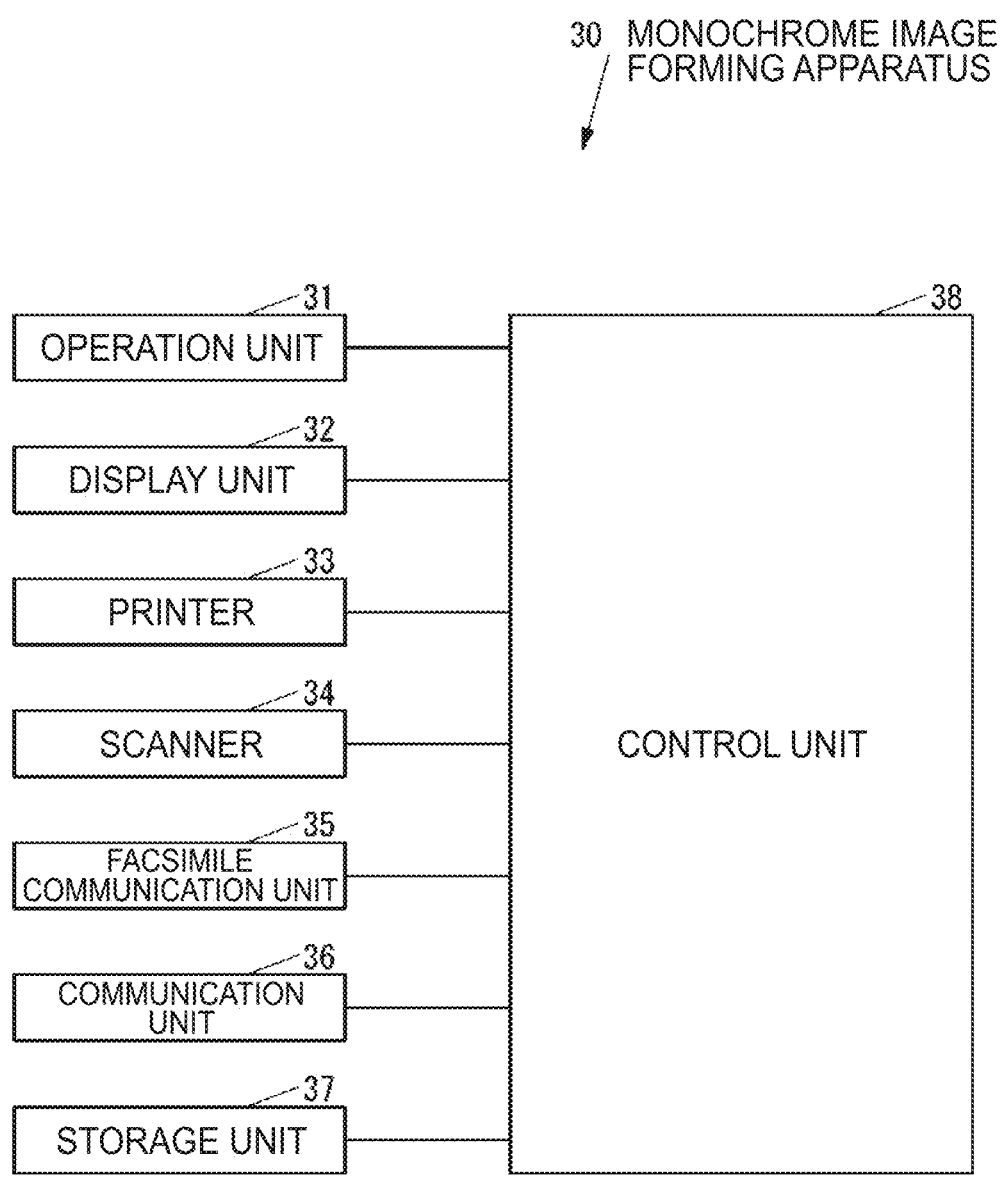
FIG. 3 is a block diagram of a monochrome image forming apparatus shown in FIG. 1 in the case of the MFP.

FIG. 3 is a block diagram of the monochrome image forming apparatus 30 in the case of the MFP.

As shown in FIG. 3, the monochrome image forming apparatus 30 includes an operation unit 31 which is an operation device such as a button for inputting various operations, a display unit 32 which is a display device such as an LCD for displaying various information, and a printer 33 which is a printing device that prints an image on a recording medium such as paper. The monochrome image forming apparatus 30 further includes a scanner 34 which is a reading device for reading an image from a document, a facsimile communication unit 35 which is a facsimile device that performs facsimile communication with an external facsimile apparatus not shown via a communication line such as a public telephone line, and a communication unit 36 which is a communication device for communicating with an external device via a network such as a LAN or the Internet, or directly by wire or wireless without intervening the network. The monochrome image forming apparatus 30 further includes a storage unit 37 which is a non-volatile storage device such as a semiconductor memory or an HDD for storing various types of information, and a control unit 38 which controls the entire monochrome image forming apparatus 30.

The control unit 38 includes, for example, a CPU, a ROM storing a program and various data, and a RAM as a memory used as a work area of the CPU in the control unit 38. The CPU in the control unit 38 executes a program stored in the storage unit 37 or the ROM in the control unit 38.

Figure 4:
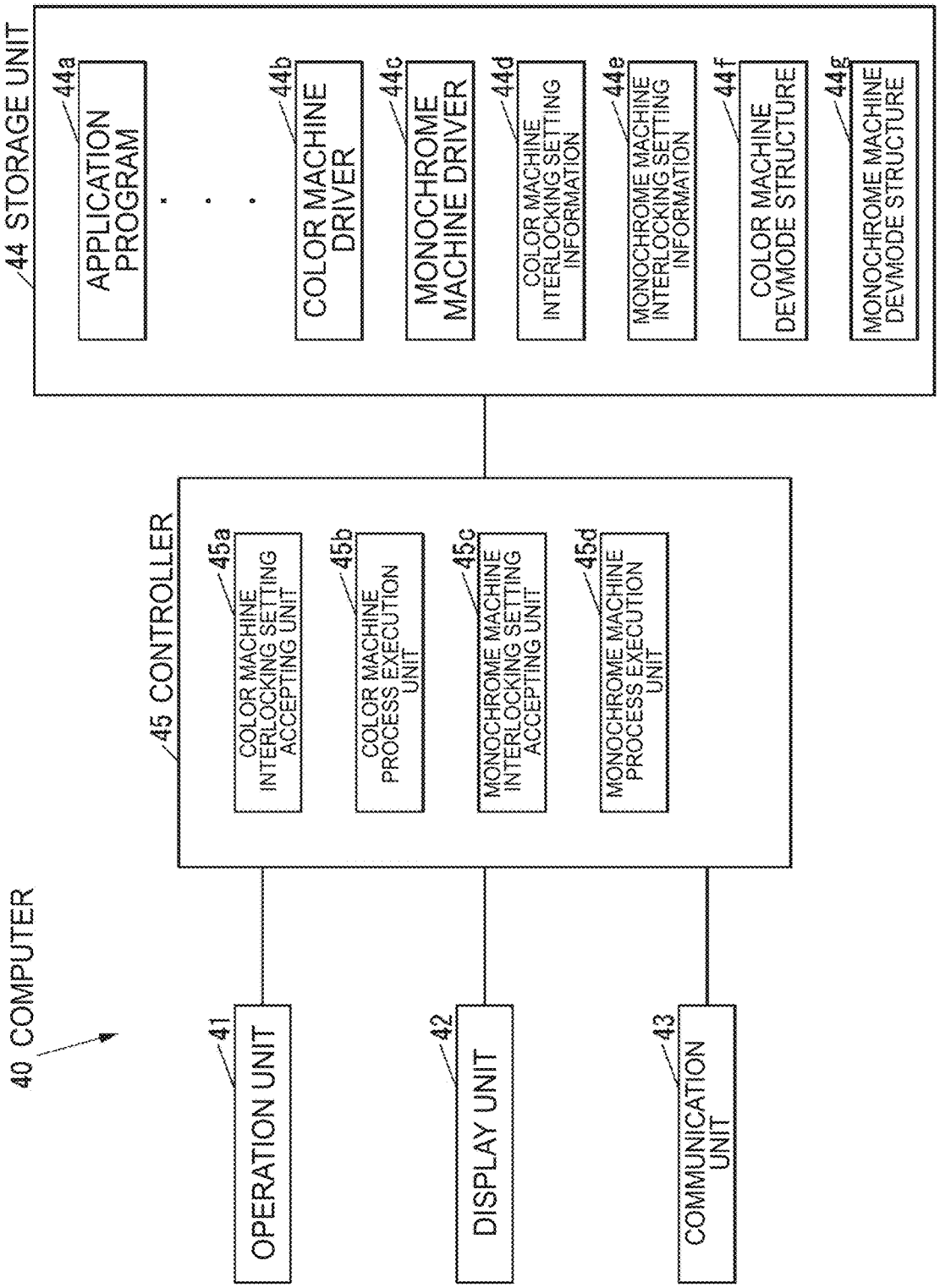
FIG. 4 is a block diagram of a computer shown in FIG. 1.

FIG. 4 is a block diagram of the computer 40.

As shown in FIG. 4, the computer 40 includes an operation unit 41 which is an operation device such as a keyboard and a mouse for inputting various operations, a display unit 42 which is a display device such as an LCD for displaying various information, and a communication unit 43 which is a communication device that communicates with an external device, via a network such as a LAN or the Internet, or directly by wire or wireless without intervening the network. The computer 40 further includes a storage unit 44 which is a non-volatile storage device such as a semiconductor memory or HDD that stores various types of information, and a controller 45 that controls the entire computer 40. The computer 40 may be configured by, for example, a personal computer (PC).

The storage unit 44 stores an application program 44a for generating print data. The storage unit 44 can store at least one application program in addition to the application program 44a. The storage unit 44 stores a color machine driver 44b as a printer driver for outputting print data generated by the application program to the color image forming apparatus 20, and a monochrome machine driver 44c as a printer driver for outputting the print data generated by the application program to the monochrome image forming apparatus 30. The application program, the color machine driver 44b, and the monochrome machine driver 44c stored in the storage unit 44 may be installed in the computer 40 at the stage of manufacturing the computer 40, may be additionally installed in the computer 40 from an external storage medium such as a compact disk (CD), a digital versatile disk (DVD) and a universal serial bus (USB) memory, or may be additionally installed on the computer 40 from the network, for example.

The storage unit 44 stores color machine interlocking setting information 44d indicating an interlocking setting which is a setting as to whether the color setting which is a setting for causing the image forming apparatus 30 to execute the color printing or the monochrome printing 20 is interlocked with the application program. The storage unit 44 further stores monochrome machine interlocking setting information 44e indicating an interlocking setting that is a setting as to whether the color setting which is a setting for causing the image forming apparatus 30 to execute the color printing or the monochrome printing is interlocked with the application program.

The storage unit 44 stores a color machine DEVMODE structure 44f, which is a DEVMODE structure as data for storing various data of the color machine driver 44b, and a monochrome machine DEVMODE structure 44g, which is a DEVMODE structure as data for storing various data of the monochrome machine driver 44c.

Figure 5:
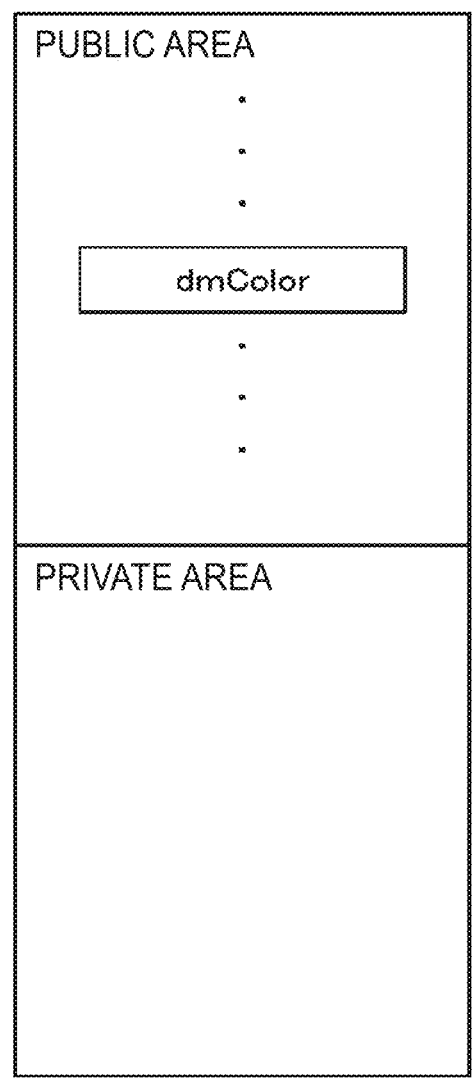
FIG. 5 is a diagram showing an example of a development mode (DEVMODE) structure for a color machine shown in FIG. 4.

FIG. 5 is a diagram showing an example of the color machine DEVMODE structure 44f.

As shown in FIG. 5, the color machine DEVMODE structure 44f includes a public area accessible from both the application program and the color machine driver 44b, and a private area accessible only from the color machine driver 44b among the application program and the color machine driver 44b. The public area of the color machine DEVMODE structure 44f includes a dmColor member as a color setting which is a setting for causing the image forming apparatus 20 to execute the color printing or the monochrome printing. The dmColor member can take any value of DMCOLOR_COLOR indicating that the color image forming apparatus 20 executes the color printing and DMCOLOR_MONOCHROME indicating that the color image forming apparatus 20 executes the monochrome printing. The color machine DEVMODE structure 44f can also include a color setting which is a setting for causing the image forming apparatus 20 to execute the color printing or the monochrome printing in the private area.

Similarly, the monochrome machine DEVMODE structure 44g includes a public area accessible from both the application program and the monochrome machine driver 44c, and a private area accessible only from the monochrome machine driver 44c among the application program and the monochrome machine driver 44c. The public area of the monochrome machine DEVMODE structure 44g includes a dmColor member as a color setting which is a setting for causing the image forming apparatus 30 to execute the color printing or the monochrome printing. The dmColor member can take one of DMCOLOR_COLOR indicating that the monochrome image forming apparatus 30 executes the color printing and DMCOLOR_MONOCHROME indicating that the monochrome image forming apparatus 30 executes the monochrome printing. The monochrome machine DEVMODE structure 44g can also include a color setting which is a setting for causing the image forming apparatus 30 to execute the color printing or the monochrome printing in the private area.

The controller 45 shown in FIG. 4 includes, for example, a CPU, a ROM storing a program and various data, and a RAM as a memory used as a working area of the CPU in the controller 45. The CPU in the controller 45 executes a program stored in the storage unit 44 or the ROM of the controller 45.

The controller 45 executes the color machine driver 44b to realize a color machine interlocking setting accepting unit 45a as an interlocking setting accepting unit for accepting an interlocking setting, which is a setting as to whether the color setting which is a setting for causing the image forming apparatus 20 to execute the color printing or the monochrome printing is interlocked with the application program, and a color machine process execution unit 45b as a process execution unit that executes the process according to the color setting in the color machine driver 44b.

The controller 45 executes the monochrome machine driver 44c to realize a monochrome machine interlocking setting accepting unit 45c as an interlocking setting accepting unit for accepting an interlocking setting, which is a setting as to whether the color setting which is a setting for causing the image forming apparatus 30 to execute the color printing or the monochrome printing is interlocked with the application program, and a monochrome machine process execution unit 45d as a process execution unit that executes the process according to the color setting in the monochrome machine driver 44c.

Next, the operation of the image forming system 10 will be described.

First, the operation of the computer 40 when accepting various settings in the color machine driver 44b will be described.

Figure 6:
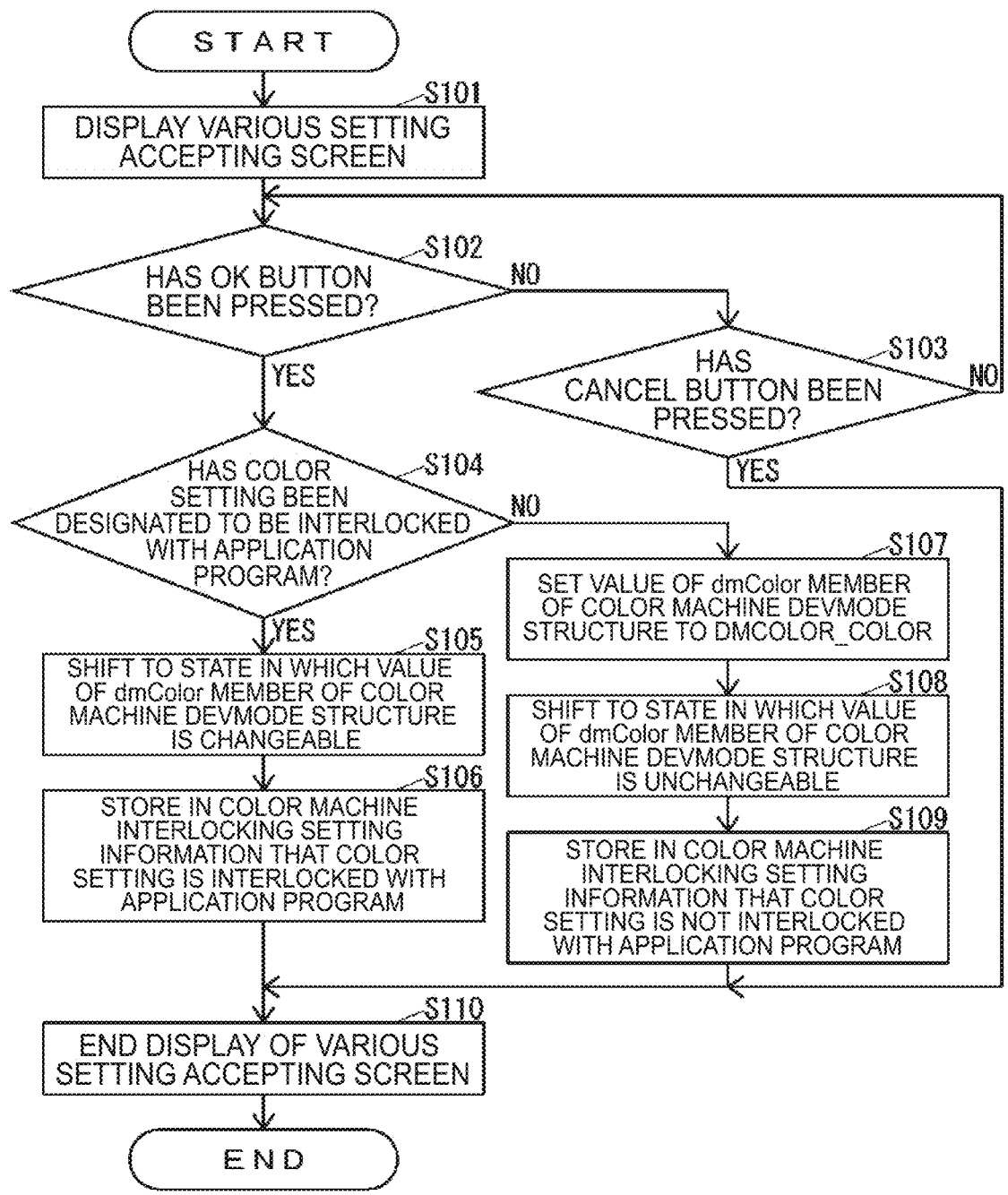
FIG. 6 is a flowchart of the operation of the computer shown in FIG. 4 when accepting various settings in a color machine driver.

FIG. 6 is a flowchart of the operation of the computer 40 when accepting the various settings in the color machine driver 44b.

When the computer 40 is instructed via the operation unit 41 to start a process for accepting the various settings in the color machine driver 44b, the computer 40 executes the operation shown in FIG. 6.

As shown in FIG. 6, the color machine interlocking setting accepting unit 45a displays on the display unit 42 a screen for accepting the various settings in the color machine driver 44b (hereinafter referred to as "various setting accepting screen") 50 (see FIG. 7) (S101).

Figure 7:
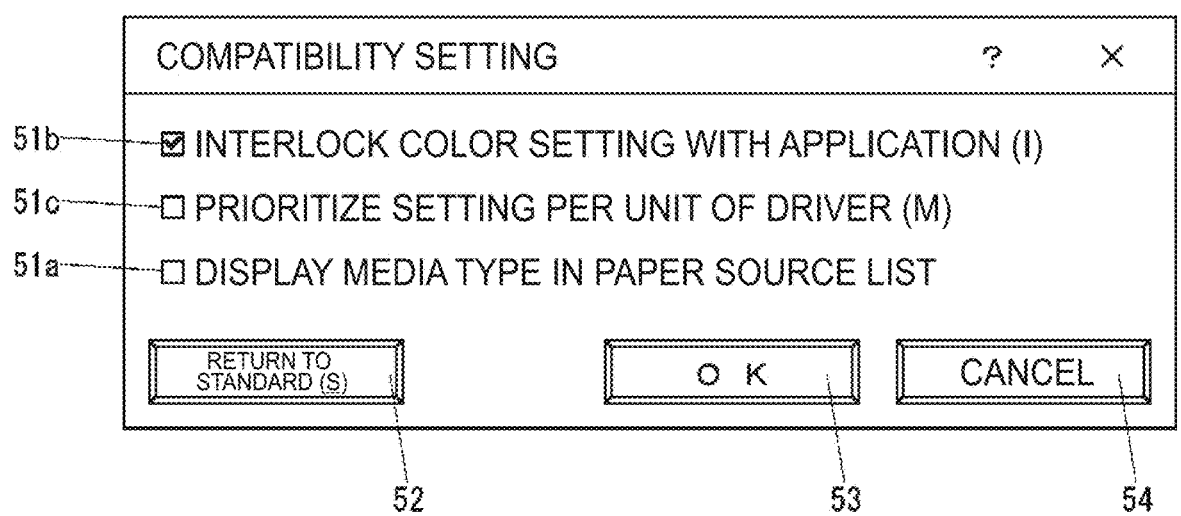
FIG. 7 is a diagram showing an example of a various setting accepting screen displayed in the operation shown in FIG. 6.

FIG. 7 is a diagram showing an example of the various setting accepting screen 50.

The various setting accepting screen 50 shown in FIG. 7 includes an interlocking setting designation check box 51a as a check box for specifying an interlocking setting, check boxes 51b and 51c for specifying a setting other than the interlocking setting, and a "return to standard" button 52 for returning the designation of various settings on the various setting accepting screen 50 to the standard. The various setting accepting screen 50 further includes an OK button 53 for accepting designation of the various settings on the various setting accepting screen 50, and a cancel button 54 for canceling acceptance of the various settings on the various setting accepting screen 50.

As shown in FIG. 6, the color machine interlocking setting accepting unit 45a determines whether the OK button 53 has been pressed after the processing of S101 (S102).

When the color machine interlocking setting accepting unit 45a determines in S102 that the OK button 53 has not been pressed, the color machine interlocking setting accepting unit 45a determines whether the cancel button 54 has been pressed (S103).

When the color machine interlocking setting accepting unit 45a determines in S103 that the cancel button 54 has not been pressed, the color machine interlocking setting accepting unit 45a executes the processing of S102.

When the color machine interlocking setting accepting unit 45a determines in S102 that the OK button 53 has been pressed, the color machine interlocking setting accepting unit 45a determines whether the color setting interlocking with the application program has been designated on the various setting accepting screen 50 at the time of the determination in S102 that the OK button 53 has been pressed (S104). Here, the situation that the interlocking setting designation check box 51a has been checked means that the color setting has been designated to be interlocked with the application program. On the other hand, the situation where the interlocking setting designation check box 51a has not checked means that the color setting has been designated not to be interlocked with the application program.

When the color machine interlocking setting accepting unit 45a determines in S104 that the color setting has been designated to be interlocked with the application program, the color machine interlocking setting accepting unit 45a shifts to a state in which the value of the dmColor member of the color machine DEVMODE structure 44f is changeable (S105).

Then, the color machine interlocking setting accepting unit 45a stores in the color machine interlocking setting information 44d that the color setting is interlocked with the application program (S106).

When the color machine interlocking setting accepting unit 45a determines in S104 that the color setting has not been designated to be interlocked with the application program, the color machine interlocking setting accepting unit 45a sets the value of the dmColor member of the color machine DEVMODE structure 44f to the DMCOLOR_COLOR (S107).

Then, the color machine interlocking setting accepting unit 45a shifts to a state in which the value of the dmColor member of the color machine DEVMODE structure 44f is unchangeable (S108).

Then, the color machine interlocking setting accepting unit 45a stores in the color machine interlocking setting information 44d that the color setting is not interlocked with the application program (S109).

When the color machine interlocking setting accepting unit 45a determines in S103 that the cancel button 54 has been pressed or when the processing of S106 or S109 is completed, the color machine interlocking setting accepting unit 45a ends the display of the various setting accepting screens 50 (S110), and then ends the operation shown in FIG. 6.

Next, the operation of the computer 40 when accepting the color setting in the application program with respect to the color image forming apparatus 20 will be described.

Figure 8:
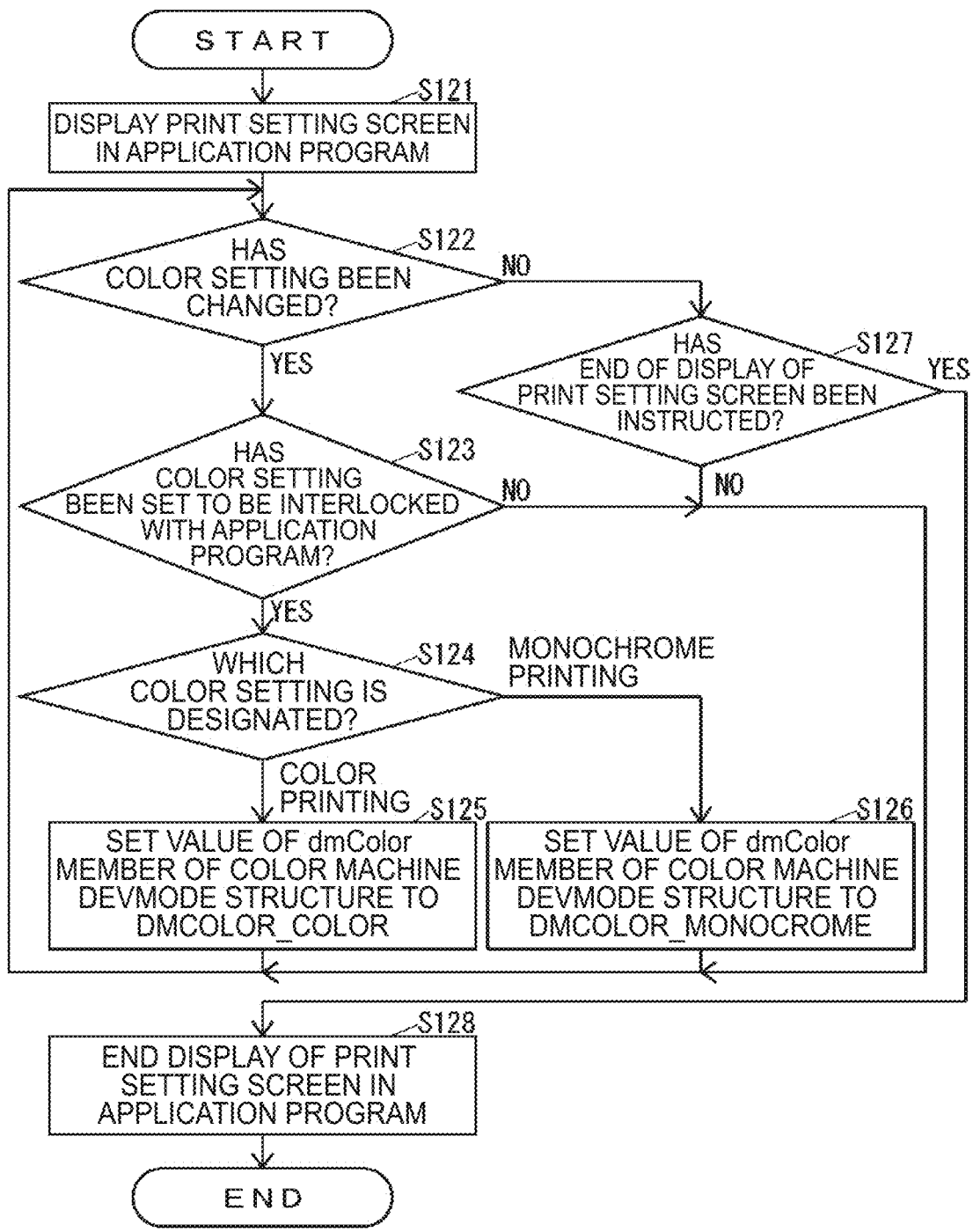
FIG. 8 is a flowchart of the operation of the computer shown in FIG. 4 when accepting a color setting in an application program with respect to the color image forming apparatus.

FIG. 8 is a flowchart of the operation of the computer 40 when accepting the color setting in the application program with respect to the color image forming apparatus 20.

When the display of a print setting screen 60 (see FIG. 9) in the application program regarding the color image forming apparatus 20 is instructed via the operation unit 41, the controller 45 in the computer 40 displays the print setting screen 60 on the display unit 42. (S121).

Figure 9:
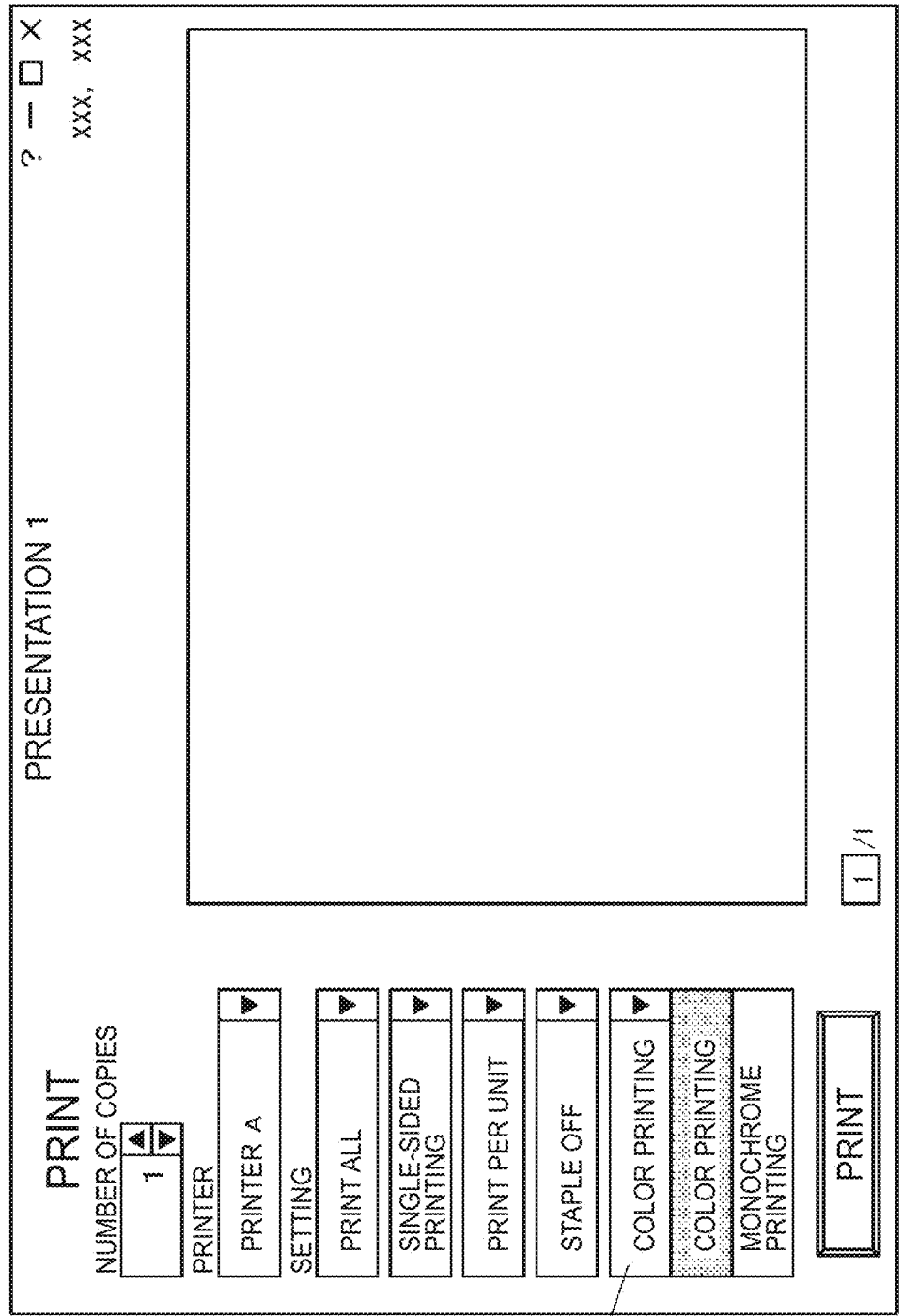
FIG. 9 is a diagram showing an example of a print setting screen in the application program with respect to the color image forming apparatus displayed in the operation shown in FIG. 8.

FIG. 9 is a diagram showing an example of the print setting screen 60 in the application program regarding the color image forming apparatus 20.

As shown in FIG. 9, the print setting screen 60 includes a drop-down list 61 for accepting the color setting.

As shown in FIG. 8, the controller 45 determines whether the color setting has been changed in the drop-down list 61 after the process of S121 (S122).

When the controller 45 determines in S122 that the color setting has been changed in the drop-down list 61, the color machine process execution unit 45*b* determines whether the color setting has been interlocked with the application program in the color machine interlocking setting information 44*d* (S123).

When the color machine process execution unit 45*b* determines in S123 that the color setting has been set to be interlocked with the application program, the color machine process execution unit 45*b* determines whether the color setting designated in the drop-down list 61 is the color printing or the monochrome printing (S124).

When the color machine process execution unit 45*b* determines in S124 that the designated color setting is the color printing, the color machine process execution unit 45*b* sets the value of the dmColor member to the DMCOLOR_COLOR based on the fact that the value of the dmColor member of the color machine DEVMODE structure 44*f* is changeable in S105 (S125), and then executes the process of S122.

When the color machine process execution unit 45*b* determines in S124 that the designated color setting is the monochrome printing, the color machine process execution unit 45*b* sets the value of the dmColor member to the DMCOLOR_MONOCHROME based on the fact that the value of the dmColor member of the color machine DEVMODE structure 44*f* is changeable in S105 (S126), and then executes the process of S122.

When the color machine process execution unit 45*b* determines in S123 that the color setting is set not to be interlocked with the application program, the controller 45 executes the process of S122 without changing the value of the dmColor member, based on the fact that the value of the dmColor member of the color machine DEVMODE structure 44*f* is unchangeable in S108.

When the controller 45 determines in S122 that the color setting has not been changed in the drop-down list 61, the controller 45 determines whether the end of the display of the print setting screen 60 has been instructed via the operation unit 41 (S127).

When the controller 45 determines in S127 that the end of the display of the print setting screen 60 has not been instructed, the controller 45 executes the process of S122.

When the controller 45 determines in S127 that the end of the display of the print setting screen 60 has been instructed, the controller 45 ends the display of the print setting screen 60 (S128), and then ends the operation shown in FIG. 8.

Next, the operation of the computer 40 when accepting the color setting in the color machine driver 44*b* will be described.

Figure 10:
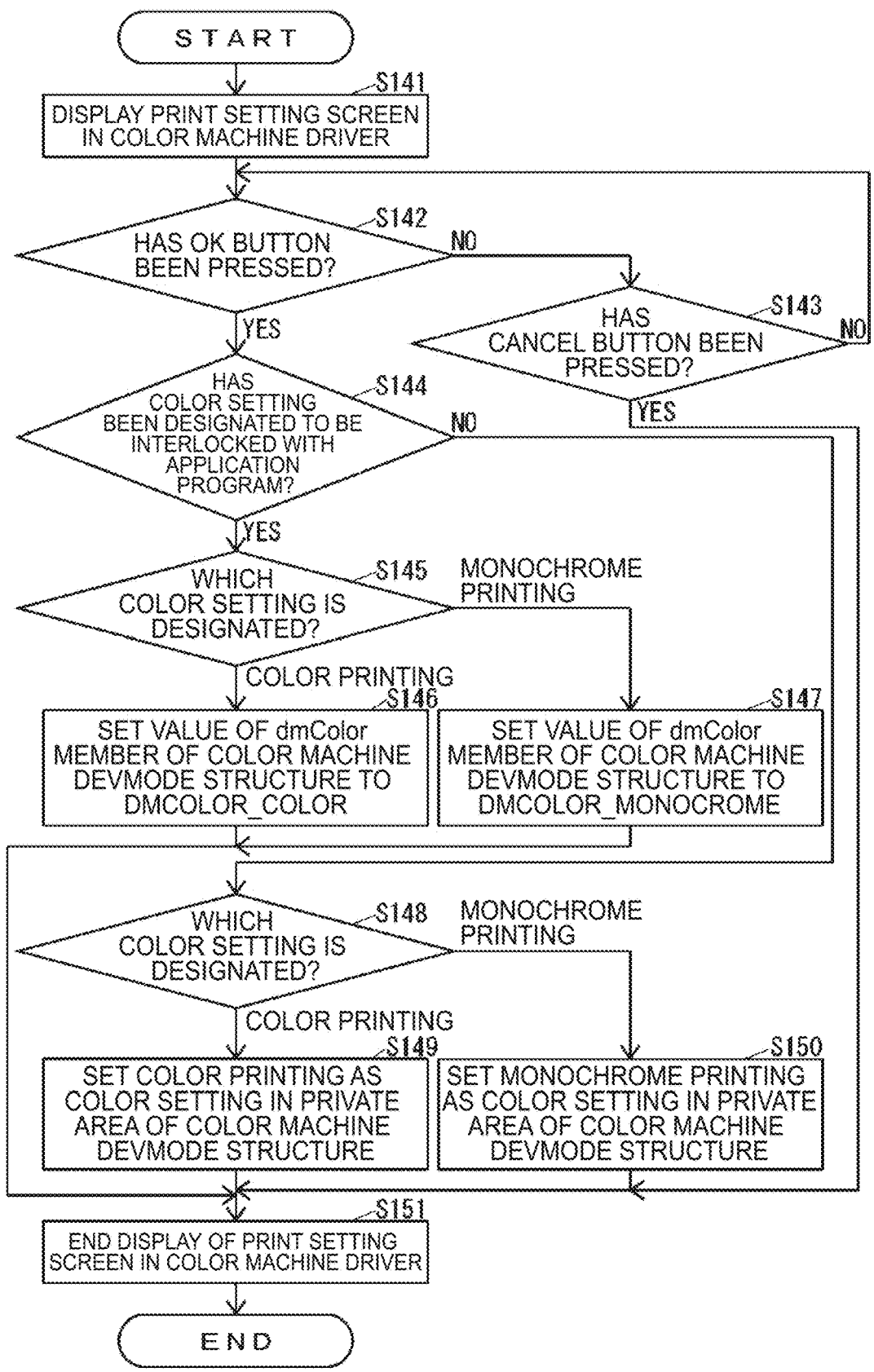
FIG. 10 is a flowchart of the operation of the computer shown in FIG. 4 when accepting the color setting in the color machine driver.

FIG. 10 is a flowchart of the operation of the computer 40 when accepting the color setting in the color machine driver 44*b*.

When the display of the print setting screen 70 (see FIG. 11) in the color machine driver 44*b* is instructed via the operation unit 41, the color machine process execution unit 45*b* in the computer 40 displays the print setting screen 70 on the display unit 42 as shown in FIG. 10 (S141).

Figure 11:
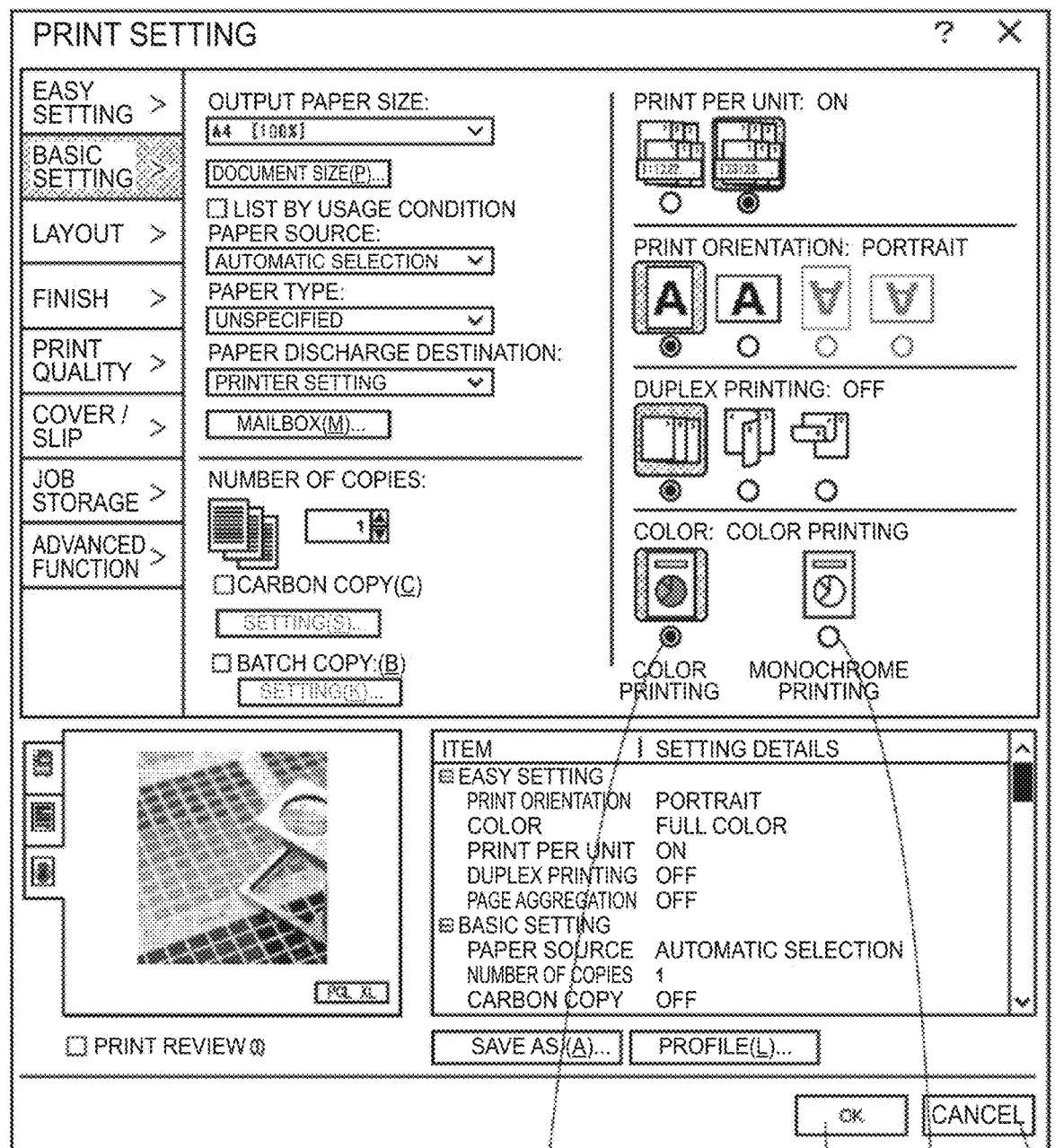
FIG. 11 is a diagram showing an example of a print setting screen in the color machine driver displayed in the operation shown in FIG. 10.

FIG. 11 is a diagram showing an example of the print setting screen 70 in the color machine driver 44*b*.

As shown in FIG. 11, the print setting screen 70 includes a radio button 71 for accepting designation of the color printing as the color setting, a radio button 72 for accepting the monochrome printing as the color setting, an OK button 73 for accepting various setting contents designated on the print setting screen 70, and a cancel button 74 for canceling the acceptance of the various settings on the print setting screen 70. The radio button group including the radio button 71 and the radio button 72 is always in a state in which only one radio button of the buttons 71 and 72 is selected.

As shown in FIG. 10, the color machine process execution unit 45*b* determines whether the OK button 73 has been pressed after the process of S141 (S142).

When the color machine process execution unit 45*b* determines in S142 that the OK button 73 has not been pressed, the color machine process execution unit 45*b* determines whether the cancel button 74 has been pressed (S143).

When the color machine process execution unit 45*b* determines in S143 that the cancel button 74 has not been pressed, the color machine process execution unit 45*b* executes the process of S142.

When the color machine process execution unit 45*b* determines in S142 that the OK button 73 has been pressed, the color machine process execution unit 45*b* determines whether the color setting is set to be interlocked with the application program in the color machine interlocking setting information 44*d* (S144).

When the color machine process execution unit 45*b* determines in S144 that the color setting is set to be interlocked with the application program, the color machine process execution unit 45*b* determines whether the color setting designated by the radio button 71 and the radio button 72 is the color printing or the monochrome printing at the time of the determination in S142 that the OK button 73 has been pressed (S145).

When the color machine process execution unit 45*b* determines in S145 that the designated color setting is the color printing, the color machine process execution unit 45*b* sets the value of the dmColor member to the DMCOLOR_COLOR (S146), based on the fact that the value of the dmColor member of the color machine DEVMODE structure 44*f* is changeable in S105.

When the color machine process execution unit 45*b* determines in S145 that the designated color setting is the monochrome printing, the color machine process execution unit 45*b* sets the value of the dmColor member to the DMCOLOR_MONOCHROME (S147), based on the fact that the value of the dmColor member of the color machine DEVMODE structure 44*f* is changeable in S105.

When the color machine process execution unit 45*b* determines in S144 that the color setting is set not to be interlocked with the application program, the color machine process execution unit 45*b* determines whether the color setting designated by the radio button 71 and the radio button 72 is the color printing or the monochrome printing at the time of the determination in S142 that the OK button 73 has been pressed (S148).

When the color machine process execution unit 45*b* determines in S148 that the designated color setting is the color printing, the color machine process execution unit 45*b* sets the color printing as the color setting in the private area of the color machine DEVMODE structure 44*f* (S149), based on the fact that the value of the dmColor member of the color machine DEVMODE structure 44*f* is unchangeable in S108.

When the color machine process execution unit 45*b* determines in S148 that the designated color setting is the monochrome printing, the color machine process execution unit 45*b* sets the monochrome printing as the color setting in the private area of the color machine DEVMODE structure 44*f* (S150), based on the fact that the value of the dmColor member of the color machine DEVMODE structure 44*f* is unchangeable in S108.

When the color machine process execution unit 45*b* determines in S143 that the cancel button 74 has been pressed, or when the process in S146, S147, S149 or S150 is completed, the color machine process execution unit 45*b* ends the display of the print setting screen 70 (S151), and then ends the operation shown in FIG. 10.

Next, the operation of the computer 40 when generating print data in the application program for the color image forming apparatus 20 will be described.

Figure 12:
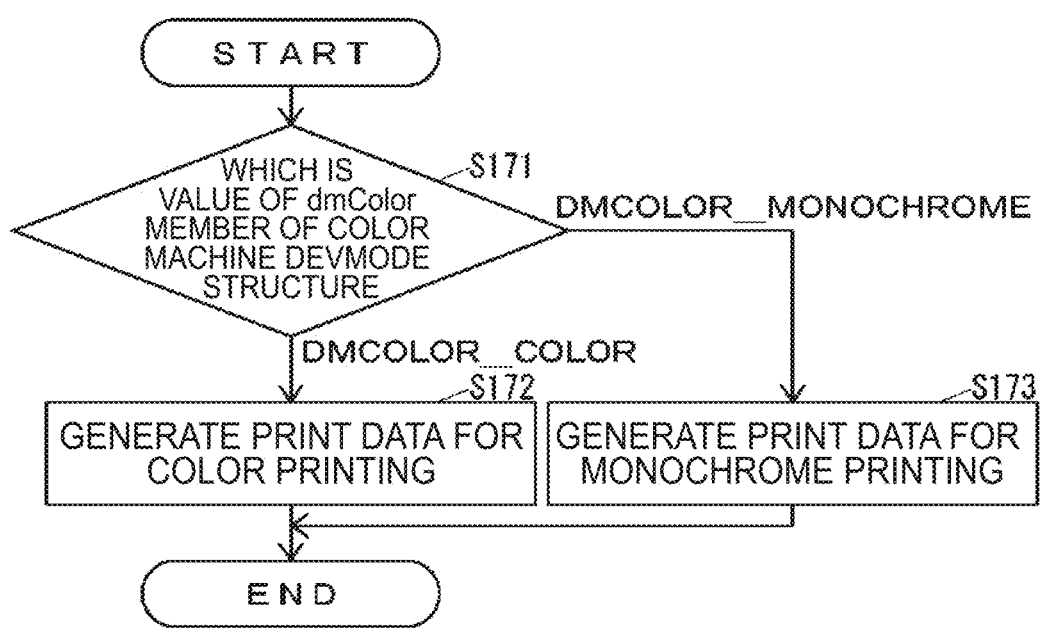
FIG. 12 is a flowchart of the operation of the computer shown in FIG. 4 when generating print data in the application program for the color image forming apparatus.

FIG. 12 is a flowchart of the operation of the computer 40 when generating print data in the application program for the color image forming apparatus 20.

When execution of printing is instructed to the color image forming apparatus 20 in the application program, as shown in FIG. 12, the controller 45 in the computer 40 determines whether the value of the dmColor member of the color machine DEVMODE structure 44*f* is the DMCOLOR_COLOR or the DMCOLOR_MONOCHROME (S171).

When the controller 45 determines in S171 that the value of the dmColor member is the DMCOLOR_COLOR, the controller 45 generates print data of color image, that is, print data for the color printing (S172), and then ends the operation shown in FIG. 12.

When the controller 45 determines in S171 that the value of the dmColor member is the DMCOLOR_MONOCHROME, the controller 45 generates print data of monochrome image, that is, print data for the monochrome printing (S173), and then ends the operation shown in FIG. 12.

Next, the operation of the computer 40 when the print data generated by the application program is output to the color image forming apparatus 20 will be described.

Figure 13:
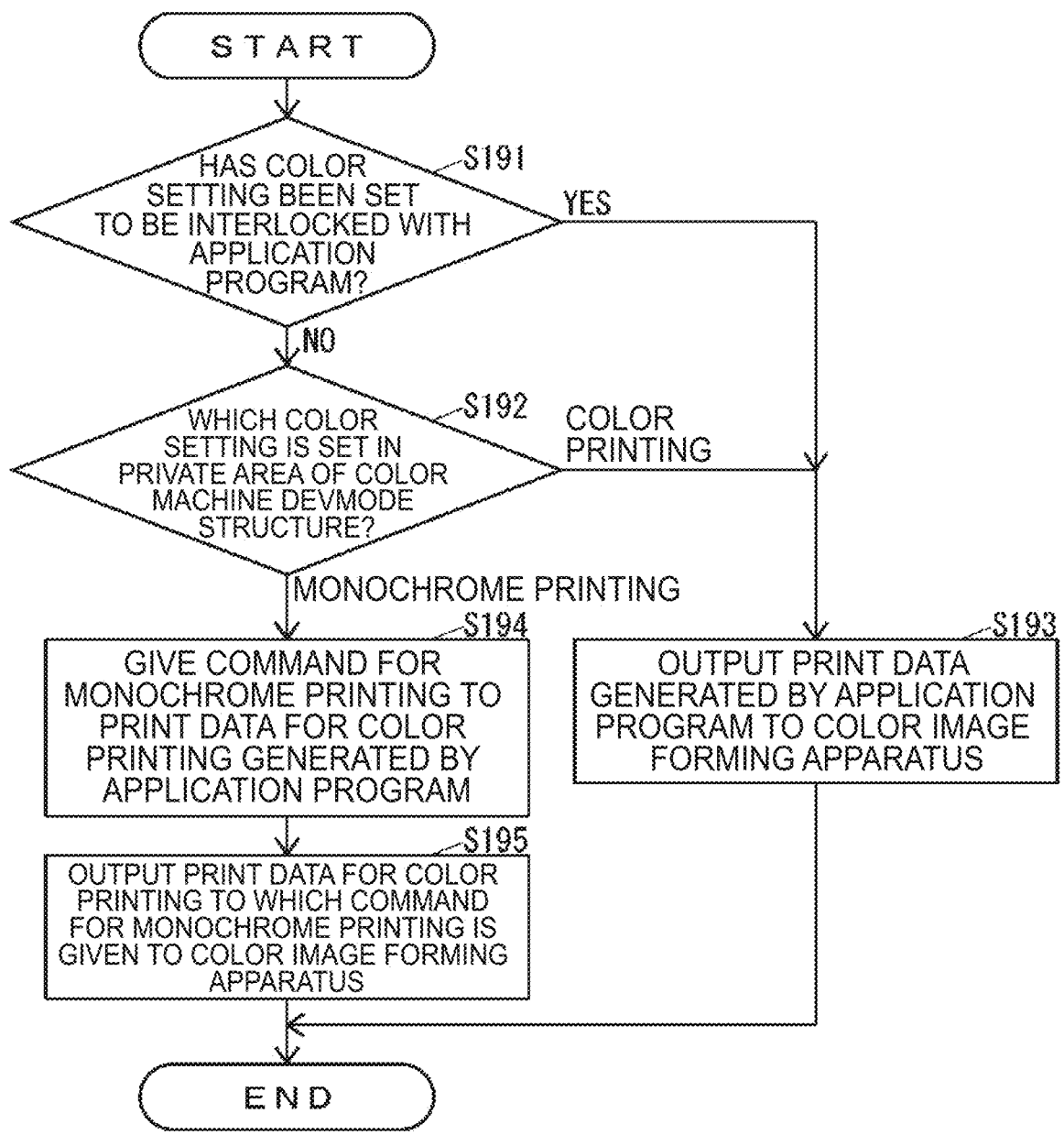
FIG. 13 is a flowchart of the operation of the computer shown in FIG. 4 when outputting the print data generated by the application program to the color image forming apparatus.

FIG. 13 is a flowchart of the operation of the computer 40 when the print data generated by the application program is output to the color image forming apparatus 20.

When print data is generated by the operation shown in FIG. 12, as shown in FIG. 13, the color machine process execution unit 45*b* in the computer 40 determines whether the color setting is set to be interlocked with the application program in the color machine interlocking setting information 44*d* (S191).

When the color machine process execution unit 45*b* determines in S191 that the color setting is set not to be interlocked with the application program, the color machine process execution unit 45*b* determines whether the color setting set in the private area of the color machine DEVMODE structure 44*f* is the color printing or the monochrome printing (S192).

When the color machine process execution unit 45*b* determines in S191 that the color setting is set to be interlocked with the application program or in S192 that the color setting is the color printing, the color machine process execution unit 45*b* outputs the print data generated by the application program in the operation shown in FIG. 12 to the color image forming apparatus 20 (S193). That is, when the print data generated by the application program in the operation shown in FIG. 12 is the print data for the color printing in S193, the color machine process execution unit 45*b* outputs the print data for the color printing to the color image forming apparatus 20. Similarly, when the print data generated by the application program in the operation shown in FIG. 12 is the print data for the monochrome printing, the color machine process execution unit 45*b* outputs the print data for the monochrome printing to the color image forming apparatus 20. It should be noted that when the color setting is set not to be interlocked with the application program in the color machine interlocking setting information 44*d*, the print data generated by the application program in the operation shown in FIG. 12 is the print data for the color printing, based on the fact that the value of the dmColor member of the color machine DEVMODE structure 44*f* is the DMCOLOR_COLOR (NO in S107 to S108 and S123). That is, in case that the color setting is set not to be interlocked with the application program in the color machine interlocking setting information 44*d* (NO in S191), when the color setting set in the private area of the color machine DEVMODE structure 44*f* is the color printing ("color printing" in S192), the color machine process execution unit 45*b* outputs the print data for the color printing to the color image forming apparatus 20.

When the color machine process execution unit 45*b* completes the process of S193, the color machine process execution unit 45*b* ends the operation shown in FIG. 13.

When the color machine process execution unit 45*b* determines in S192 that the color setting is the monochrome printing, the color machine process execution unit 45*b* gives a command for the monochrome printing to the print data generated by the application program in the operation shown in FIG. 12 (S194). Here, when the color setting is set not to be interlocked with the application program in the color machine interlocking setting information 44*d*, the print data generated by the application program in the operation shown in FIG. 12 is the print data for the color printing as described above. That is, in S194, the color machine process execution unit 45*b* gives a command for the monochrome printing to the print data for the color printing.

After the process of S194, the color machine process execution unit 45*b* outputs the print data for the color printing to which the command for the monochrome printing is given in S194 to the color image forming apparatus 20 (S195), and then ends the operation shown in FIG. 13.

Next, the operation of the color image forming apparatus 20 when printing is executed based on the print data input from the computer 40 will be described.

Figure 14:
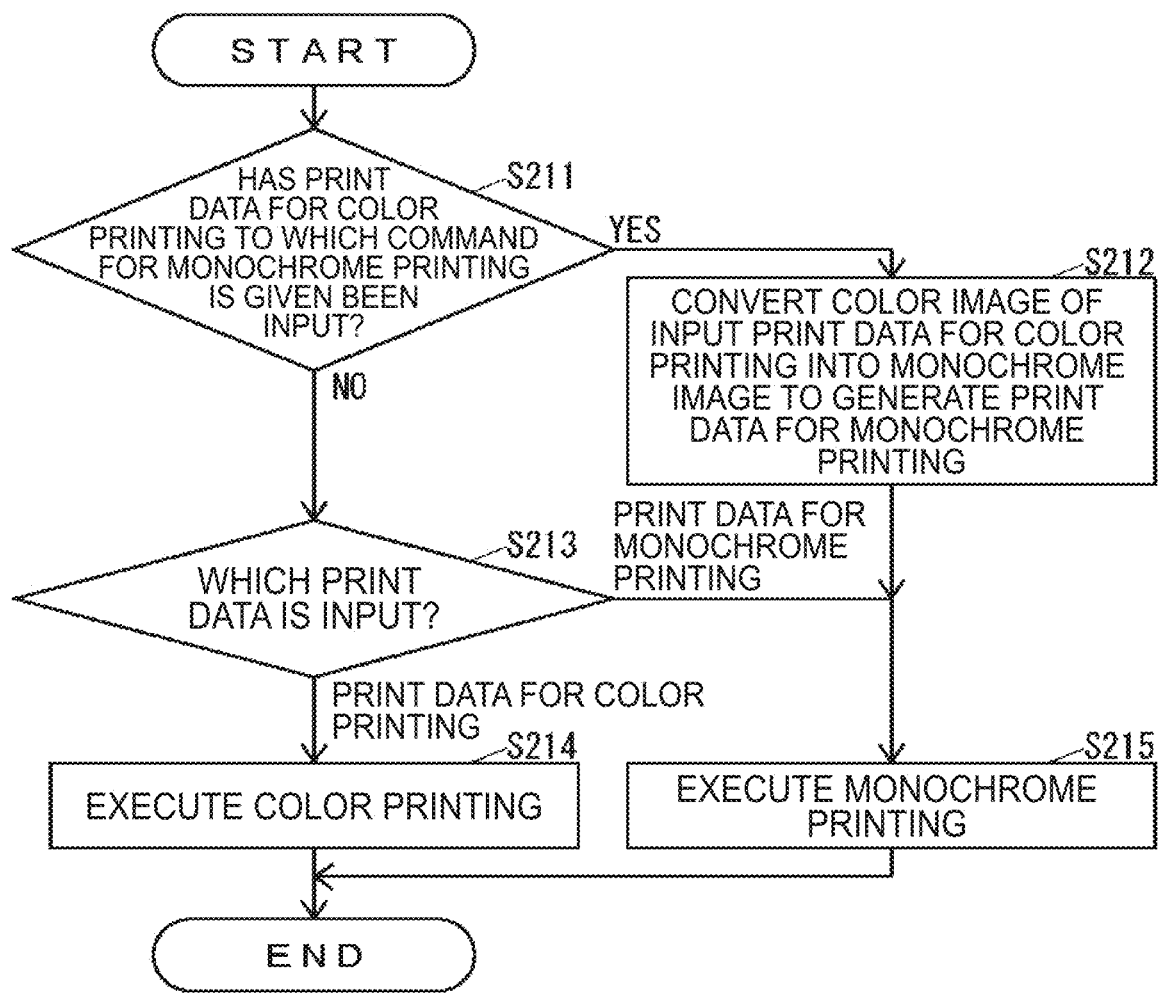
FIG. 14 is a flowchart of the operation of the color image forming apparatus shown in FIG. 2 when printing based on the print data input from the computer.

FIG. 14 is a flowchart of the operation of the color image forming apparatus 20 when printing is executed based on the print data input from the computer 40.

When print data is input from the computer 40, as shown in FIG. 14, the monochrome imager 28*a* in the color image forming apparatus 20 determines whether the print data input from the computer 40 is the print data for the color printing to which the command for the monochrome printing is given (S211).

When the monochrome imager 28*a* determines in S211 that the print data input from the computer 40 is the print data for the color printing to which the command for the monochrome printing is given, the monochrome imager 28*a* converts the color image of the print data for the color printing input from the computer 40 into a monochrome image to generate print data for the monochrome printing (S212).

When the monochrome imager 28*a* in the color image forming apparatus 20 determines in S211 that the print data input from the computer 40 is not the print data for the color printing to which the command for the monochrome printing is given, the control unit 28 in the color image forming apparatus 20 determines whether the print data input from the computer 40 is the print data for the color printing or the print data for the monochrome printing (S213).

When the control unit 28 determines in S213 that the print data is the data for the color printing, the control unit 28 executes the color printing based on the print data for the color printing input from the computer 40 (S214), and then ends the operation shown in FIG. 14.

When the control unit 28 determines in S213 that the process of S212 is completed or the print data is the data for the monochrome printing, the control unit 28 executes the monochrome printing based on the print data for the monochrome printing generated in S212 or the print data for the monochrome printing input from the computer 40 (S215), and then ends the operation shown in FIG. 14.

It is noted that the operation of the image forming system 10 relating to printing by the color image forming apparatus 20 has been described above. However, the operation of the image forming system 10 relating to printing by the monochrome image forming apparatus 30 is the same except for the points described below.

The operation of the image forming system 10 relating to printing by the monochrome image forming apparatus 30 is the same as that in which the color image forming apparatus 20, the color machine driver 44*b*, the color machine interlocking setting information 44*d*, the color machine DEVMODE structure 44*f*, the color machine interlocking setting accepting unit 45*a*, and the color machine process execution unit 45*b* is respectively replaced with the monochrome image forming apparatus 30, the monochrome machine driver 44*c*, the monochrome machine interlocking setting information 44*e*, the monochrome machine DEVMODE structure 44*g*, the monochrome machine interlocking setting accepting unit 45*c*, and the monochrome machine process execution unit 45*d* in the description of the operation of the image forming system 10 relating to printing by the color image forming apparatus 20.

Figure 15:
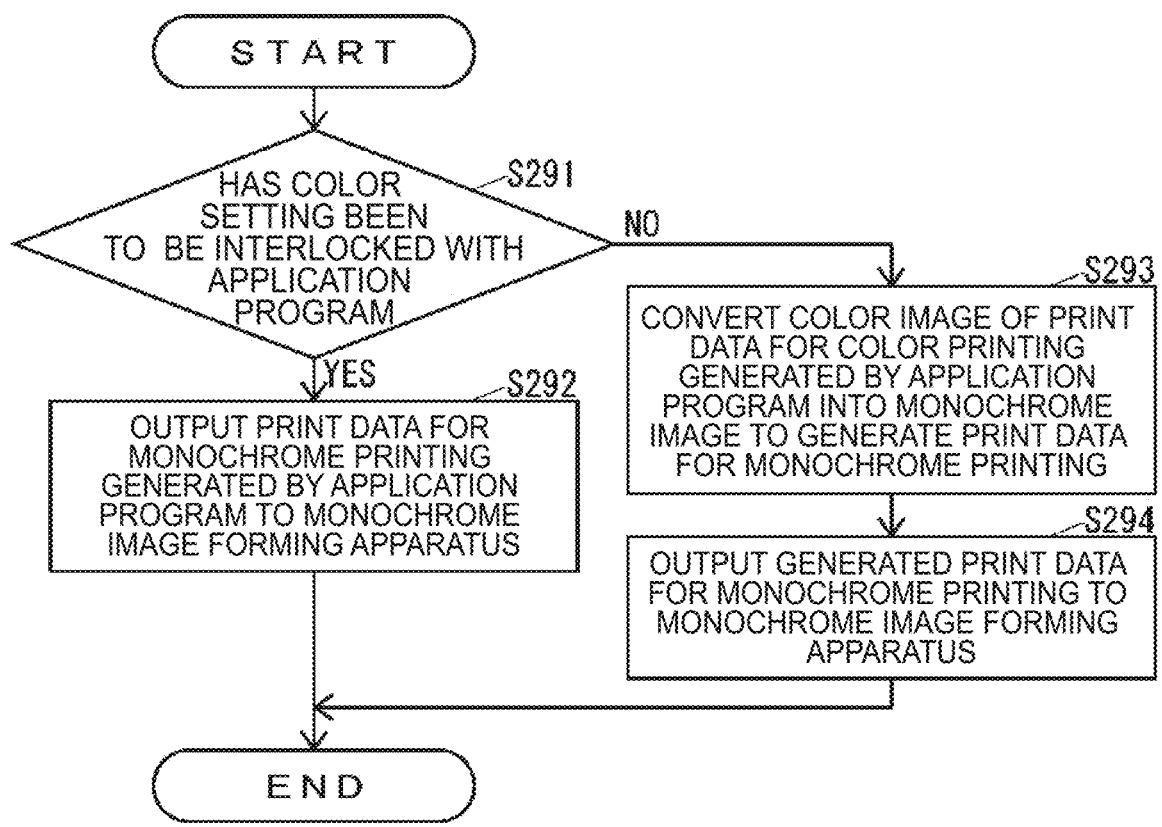
FIG. 15 is a flowchart of the operation of the computer shown in FIG. 4 when outputting the print data generated by the application program to the monochrome image forming apparatus.

Further, in the operation of the image forming system 10 relating to printing by the monochrome image forming apparatus 30, the monochrome machine process execution unit 45*d* in the computer 40 executes the operation shown in FIG. 15 instead of the operation shown in FIG. 13.

FIG. 15 is a flowchart of the operation of the computer 40 when the print data generated by the application program is output to the monochrome image forming apparatus 30.

When print data is generated by the same operation as that shown in FIG. 12, as shown in FIG. 15, the monochrome machine process execution unit 45*d* in the computer 40 determines whether the color setting is set to be interlocked with the application program in the monochrome machine interlocking setting information 44*e* (S291).

When the monochrome machine process execution unit 45*d* determines in S291 that the color setting is set to be interlocked with the application program, the monochrome machine process execution unit 45*d* outputs the print data for the monochrome printing generated by the application program in the same operation as that shown in FIG. 12 to the monochrome image forming apparatus 30 (S292). Note that since the monochrome image forming apparatus 30 can only execute the monochrome printing, the print data generated by the application program in the same operation as that shown in FIG. 12 is the print data for the monochrome printing when the color setting is set to be interlocked with the application program in the monochrome machine interlocking setting information 44*e*.

It should be noted that, as described above regarding the process of S193, when the color setting is set not to be interlocked with the application program in the monochrome machine interlocking setting information 44*e*, since the value of the dmColor member of the monochrome machine DEVMODE structure 44*g* is the DMCOLOR_COLOR, the print data generated by the application program in the same operation as that shown in FIG. 12 is the print data for the color printing.

When the monochrome machine process execution unit 45*d* determines in S291 that the color setting is set not to be interlocked with the application program, the monochrome machine process execution unit 45*d* converts the color image of the print data generated by the application program into a monochrome image in the same operation as that shown in FIG. 12 to generate print data for the monochrome printing (S293).

Then, the monochrome machine process execution unit 45*d* outputs the print data for the monochrome printing generated in S293 to the monochrome image forming apparatus 30 (S294), and then ends the operation shown in FIG. 15.

As described above, the computer 40 causes the application program to generate the print data for the color image (No in S107 to S108 and S123, "DMCOLOR_COLOR" in S171 and S172), and then executes the monochrome imaging process for converting the color image into the monochrome image by the printer driver (S194 or S293). Therefore, the computer 40 can suppress deterioration in the image quality of the monochrome printing even when the application program that generates the print data is used so that the image quality in the print data for the monochrome printing is lower than the image quality in the print data for the color printing.

The computer 40 converts the color image print data generated by the application program into the monochrome image (S293), and then outputs the converted image print data to the image forming apparatus (S294). Accordingly, the computer 40 can suppress deterioration in the image quality of the monochrome printing, when the application program that generates the print data is used so that the image quality of the print data for the monochrome printing is lower than the image quality of the print data for the color printing, even when the printing is executed by an image forming apparatus that does not have the ability to convert the print data into the monochrome image.

The computer 40 gives the command for causing the image forming apparatus to convert the print data generated by the application program into the monochrome image (S194), and outputs the color image print data to the image forming apparatus (S195). Accordingly, the computer 40 does not need to convert the color image in the print data into the monochrome image by the computer 40 itself, and can suppress the processing burden on the computer 40 itself.

The color image forming apparatus 20 includes the monochrome imager 28a that converts the color image into the monochrome image, and the monochrome image forming apparatus 30 does not include the monochrome image forming unit that converts the color image into the monochrome image. Therefore, the computer 40 employs a process for giving a print data a command for causing the color image forming apparatus 20 to convert the color image into the monochrome image as the monochrome image forming processing for the print data to be output to the color image forming apparatus 20. Further, the computer 40 employs the process for converting the color image in the print data into the monochrome image by the computer 40 itself as the monochrome image processing for the print data to be output to the monochrome image forming apparatus 30.

A color image forming apparatus other than the color image forming apparatus 20 usually includes the monochrome image forming unit, as with the color image forming apparatus 20. A monochrome image forming apparatus other than the monochrome image forming apparatus 30 usually do not include the monochrome image forming unit, as with the monochrome image forming apparatus 30. Accordingly, the computer 40 may employ a process for giving a print data a command for causing the color image forming apparatus to convert the color image into the monochrome image as the monochrome image forming processing for the print data to be output to the color image forming apparatus. Further, the computer 40 may employ a process for converting the color image in the print data into the monochrome image by the computer 40 itself as the monochrome image processing for the print data to be output to the monochrome image forming apparatus.

The computer 40 may appropriately grasp or recognize in advance whether the image forming apparatus to which the print data is output includes the monochrome imager, by inquiring to the image forming device, etc. When the image forming apparatus includes the monochrome imager, the computer 40 may employ a process for giving the print data the command for causing the image forming apparatus to convert the color image into the monochrome image, as the monochrome image processing for the print data to be output to the image forming apparatus. Further, when the image forming apparatus does not include the monochrome image forming unit, the computer 40 may employ a process for converting the color image in the print data into the monochrome image by the computer 40 itself, as the monochrome image processing for the print data to be output to the image forming device.

In the present embodiment, the computer 40 accepts the interlocking settings via the various setting accepting screen 50. However, the computer 40 may accept the interlocking setting by a method other than the various setting accepting screen 50. For example, the computer 40 may accept the interlocking setting of the printer driver via the setting screen displayed at the time when the printer driver is installed.

When the printer driver specifies that the color setting is not interlocked with the application program (NO in S104), the computer 40 always generates the print data for the color image (NO in S107 to S108 and S123, "DMCOLOR_COLOR" in S171 and S172). Further, when the monochrome printing is set as the color setting in S150 on the print setting screen in the printer driver, the computer 40 executes the monochrome imaging process for converting the color image in the print data into the monochrome image (S194 or S293). Therefore, the computer 40 can suppress deterioration of the image quality of the monochrome printing by the user opening the print setting screen in the printer driver for the designation to execute the color printing or the monochrome printing. Accordingly, the computer 40 can improve the satisfaction given to the user who prioritizes the image quality over the convenience when the printer driver specifies that the color setting is not interlocked with the application program.

When the printer driver specifies that the color setting is interlocked with the application program (YES in S104), the computer 40 can generate the print data corresponding to the color setting accepted in S125 or S126 on the print setting screen in the application program (S171 to S173). In other words, compared with the case where the printer driver has designated that the color setting is not interlocked with the application program, although image quality may be reduced when executing the monochrome printing, the computer 40 does not need to allow the user to open the print setting screen in the printer driver in order to specify whether to execute the color printing or the monochrome printing, and can allow the user to specify whether to execute the color printing or the monochrome printing only on the print setting screen in the application program. Therefore, when the printer driver specifies that the color setting is interlocked with the application program, the computer 40 can improve the satisfaction given to the user who prioritizes convenience over image quality.

The image forming apparatus of the present disclosure is the MFP in the present embodiment. However, the image forming apparatus of the present disclosure may be an image forming apparatus other than the MFP, for example, a printer dedicated machine.

What is claimed is:

1. A printer driver for outputting print data generated by an application program for generating the print data, to an image forming apparatus connected to the printer driver through a network;
    causing a computer connected to the image forming apparatus through the network, to execute an interlocking setting accepting unit which accepts an interlocking setting which is a setting as to whether a first color setting which is a setting for causing the image forming apparatus to execute color printing or monochrome printing is interlocked between the printer driver and the application program, and to execute a process execution unit which executes a process corresponding to a second color setting in the printer driver, which is a setting for causing the image forming apparatus to execute color printing or monochrome printing,
    wherein the application program generates the print data in accordance with the first color setting, and the process execution unit outputs the print data generated by the application program, to the image forming apparatus in accordance with the second color setting in the printer driver and the interlocking setting, and
    wherein in case that the first color setting is set not to be interlocked between the printer driver and the application program in the interlocking setting and the second color setting in the printer driver is the setting for causing the image forming apparatus to execute the monochrome printing, the process execution unit causes the application program to generate the print data of a color image and executes a process to convert the generated print data of the color image into the print data of a monochrome image.

2. The printer driver according to claim 1, wherein the process execution unit causes the application program to give a command for causing the image forming apparatus to convert the generated print data of the color image into the print data of the monochrome image to the print data.

3. The printer driver according to claim 1, wherein the computer includes a storage unit which stores the interlocking setting and the first color setting, and the interlocking setting accepting unit controls whether the stored first color setting is to be unchangeable, in accordance with the interlocking setting.

* * * * *